(No Model.) 5 Sheets—Sheet 1.
F. F. RAYMOND, 2d.
HEEL MOLDING AND LOADING MACHINE.

No. 559,789. Patented May 5, 1896.

WITNESSES. INVENTOR.

(No Model.) 5 Sheets—Sheet 2.

F. F. RAYMOND, 2d.
HEEL MOLDING AND LOADING MACHINE.

No. 559,789. Patented May 5, 1896.

WITNESSES. INVENTOR.

(No Model.)
F. F. RAYMOND, 2d.
HEEL MOLDING AND LOADING MACHINE.
No. 559,789.
Patented May 5, 1896.
5 Sheets—Sheet 3.
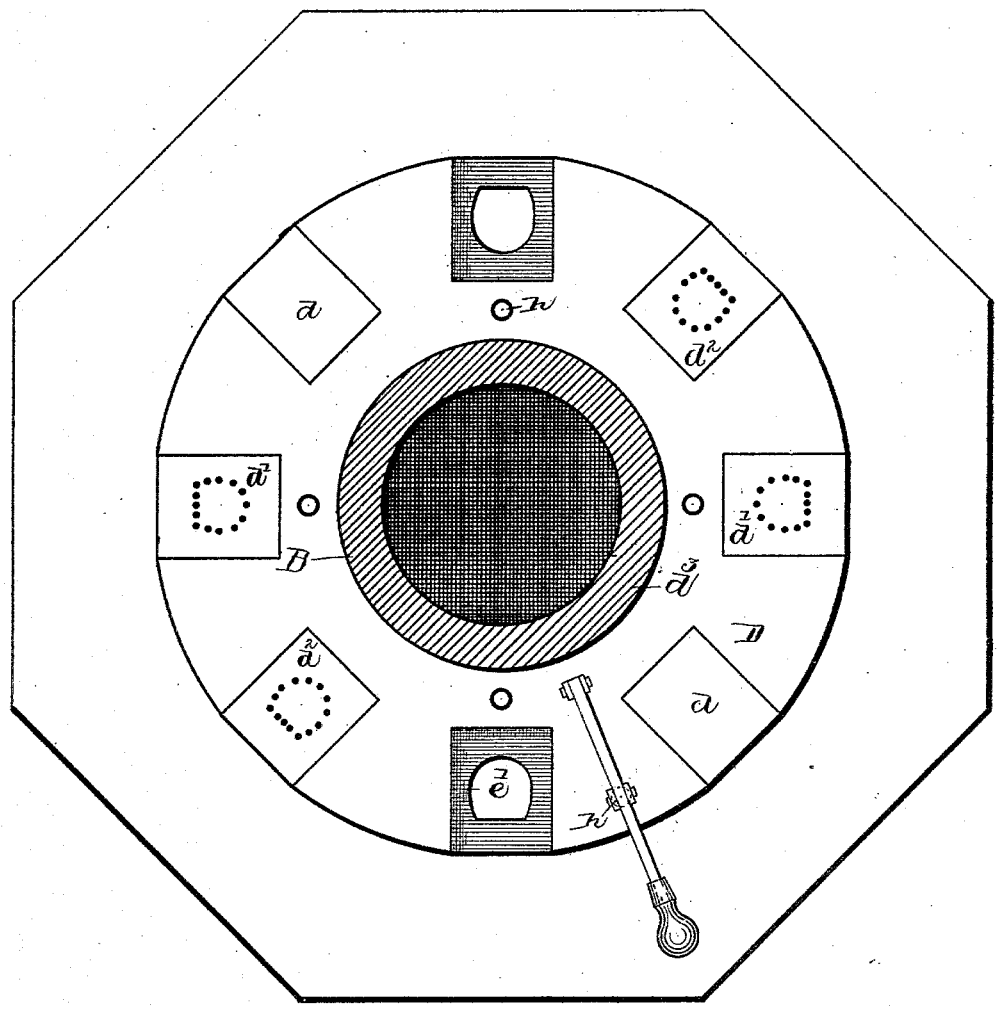
Fig-3-
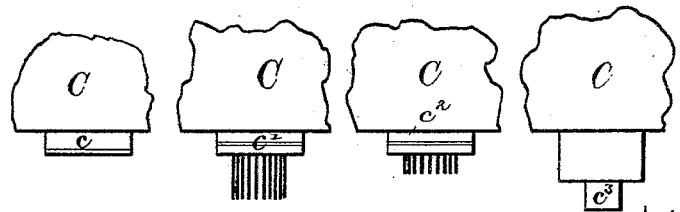
Fig-4-
WITNESSES
INVENTOR (No Model.)  5 Sheets—Sheet 4.
F. F. RAYMOND, 2d.
HEEL MOLDING AND LOADING MACHINE.
No. 559,789.  Patented May 5, 1896.
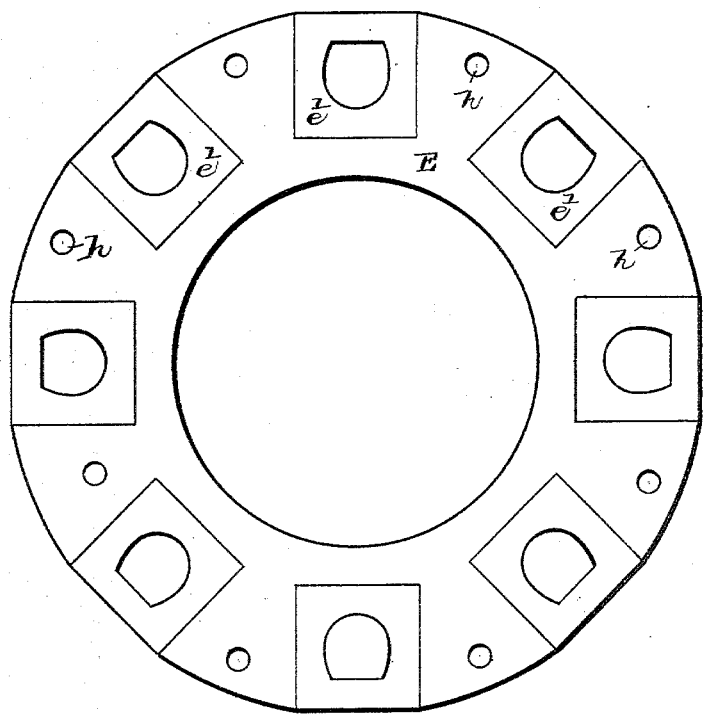
Fig-5-
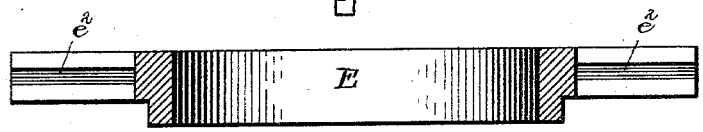
Fig-6-
Fig-7-
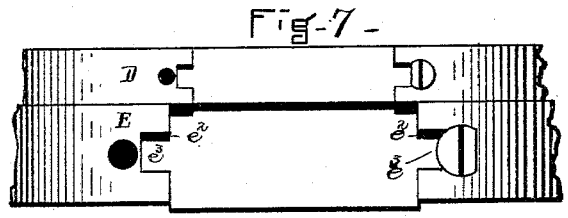
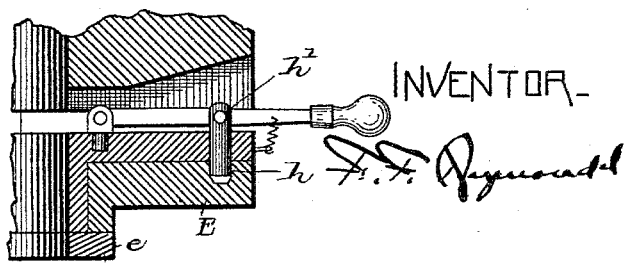
Fig-8-
WITNESSES.
J. M. Dolan
A. C. Merrill
INVENTOR-
F. F. Raymond (No Model.) 5 Sheets—Sheet 5.

F. F. RAYMOND, 2d.
HEEL MOLDING AND LOADING MACHINE.

No. 559,789. Patented May 5, 1896.

WITNESSES.
J. H. Dolan.
A. B. McEdill.

INVENTOR.
F. F. Raymond

UNITED STATES PATENT OFFICE.

FREEBORN F. RAYMOND, 2D, OF NEWTON, MASSACHUSETTS, ASSIGNOR TO JAMES W. BROOKS, OF PETERSHAM, AND JOHN BROOKS, OF CAMBRIDGE, MASSACHUSETTS, TRUSTEES.

HEEL MOLDING AND LOADING MACHINE.

SPECIFICATION forming part of Letters Patent No. 559,789, dated May 5, 1896.

Application filed June 24, 1889. Serial No. 315,321. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Heel Molding and Loading Machines, of which the following is a full, clear, and exact description, reference being had to the accompanying drawings, forming a part of this specification, in explaining its nature.

The invention relates to a heel molding and compressing machine having a head carrying a gang or group of awls, a gang or group of drivers and an ejector, a table having a templet through the holes of which the awls are reciprocated, a templet through the holes of which the drivers are reciprocated, and a block having an ejector-plate and a table supporting dies horizontally movable in relation to said templets and block.

It further relates to a heel molding and loading machine adapted to simultaneously mold, prick, and load two or more heels at the same time, so that each reciprocation of the machine produces two or more loaded heel-blanks.

It further relates to a heel molding and loading machine for simultaneously molding, pricking, and loading two groups of heels, so organized or arranged that the different operative devices serve to balance each other, and the pressure upon the cross-head of the machine is thereby equalized.

The invention further relates to various details of organization and construction, all of which will hereinafter be fully described.

Figure 1:
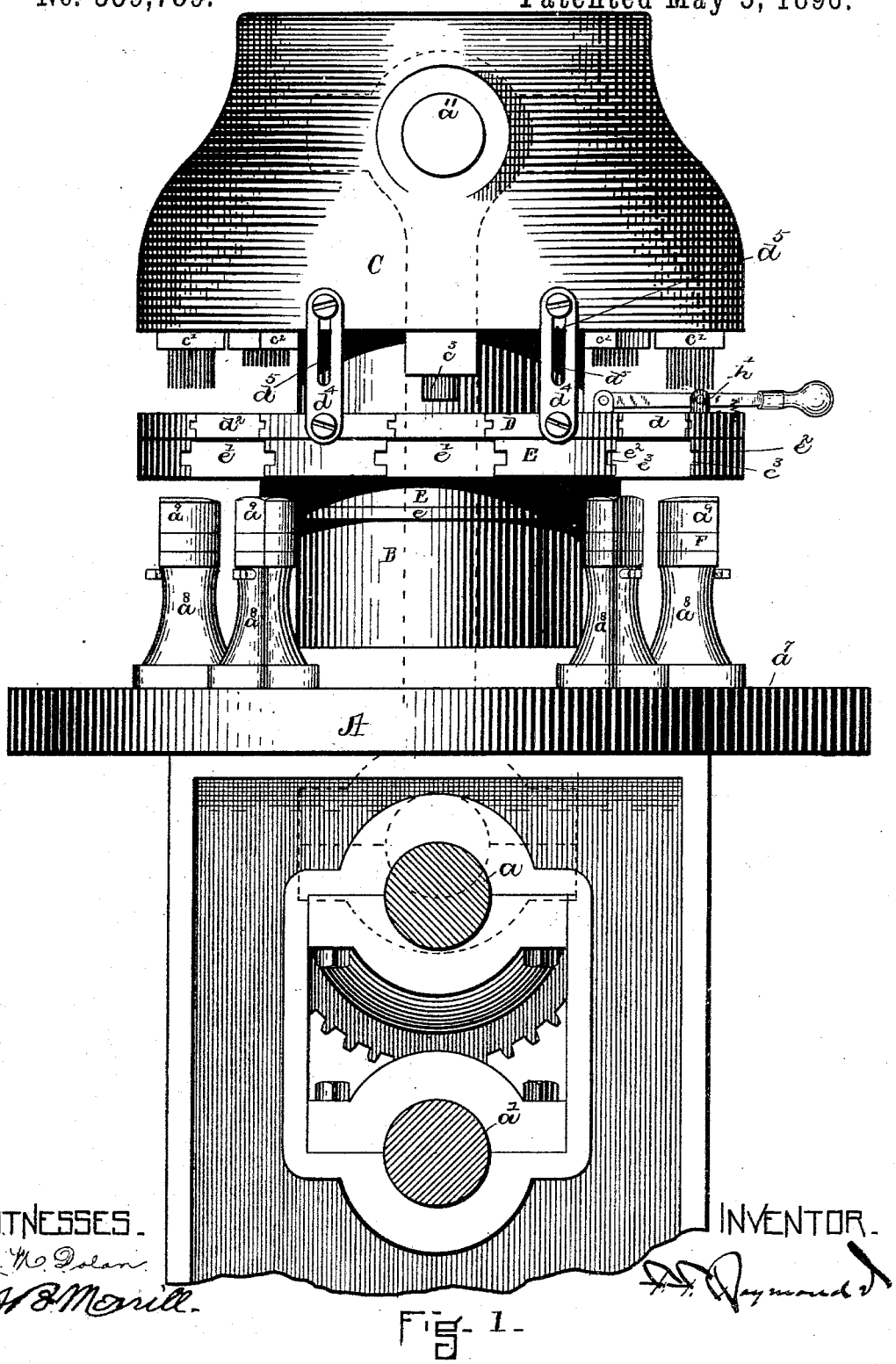
Figure 2:
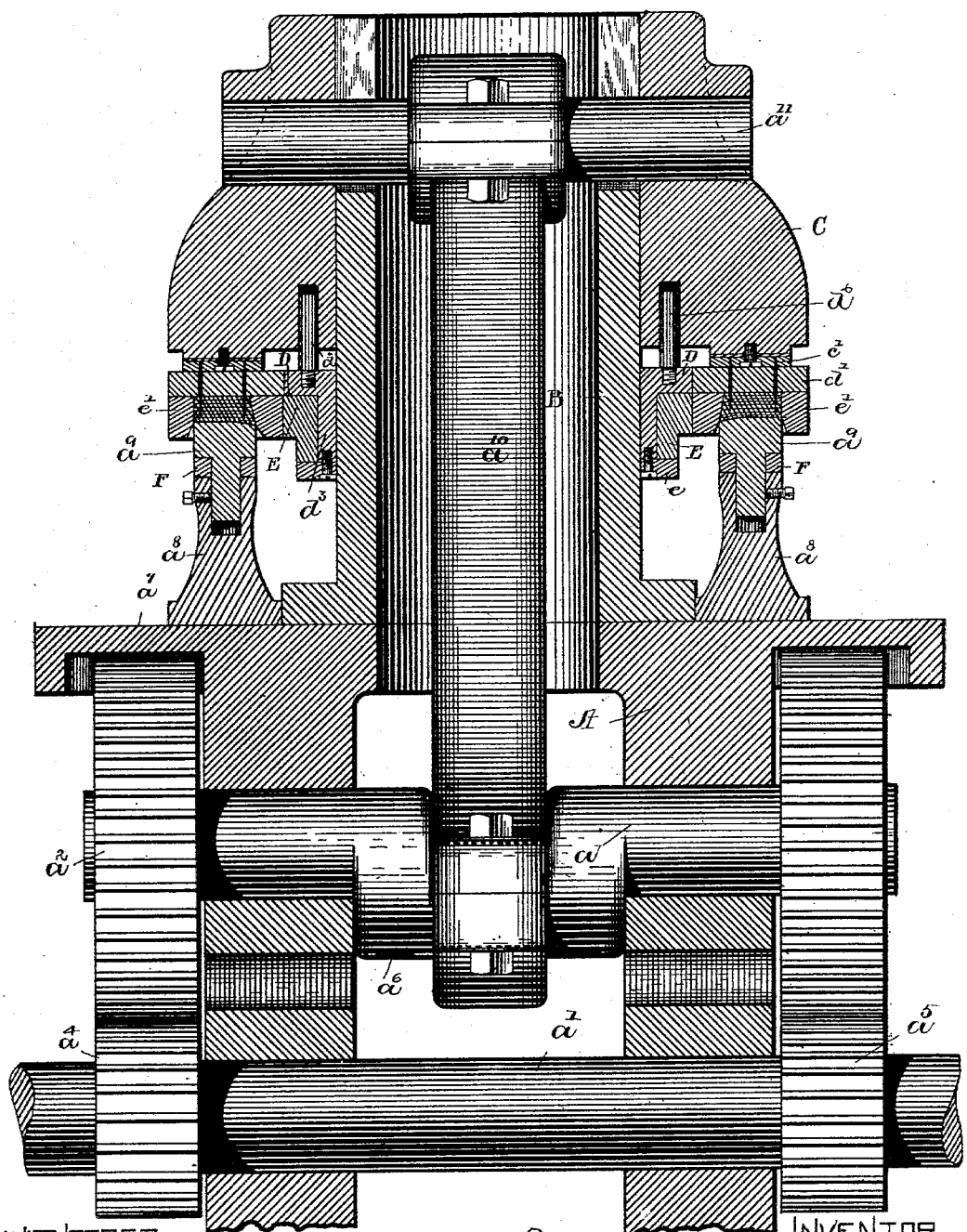
Figure 9:
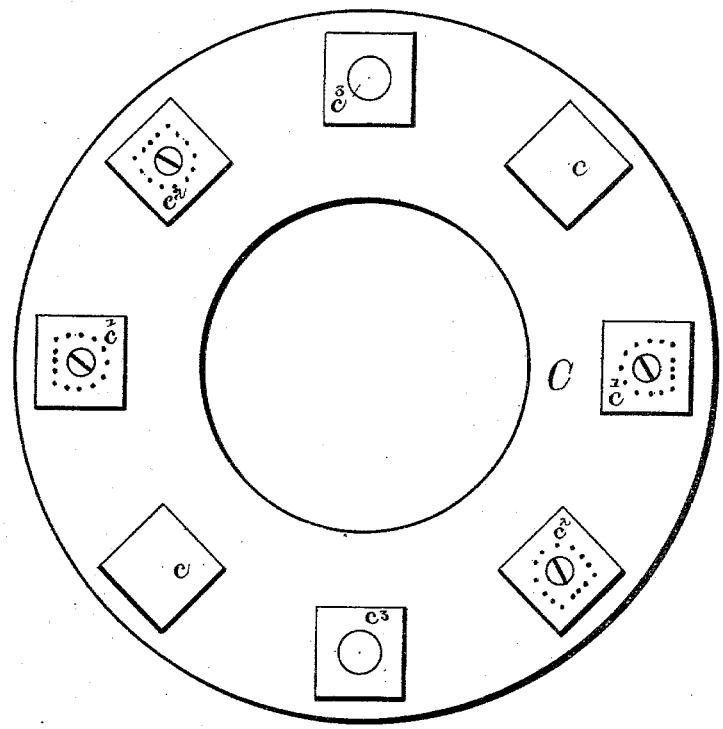
Figure 11:
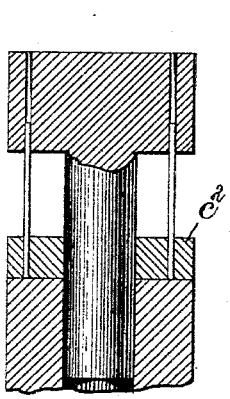
Figure 10:
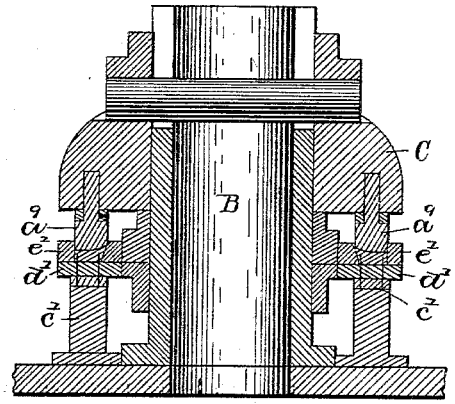
Figure 12:
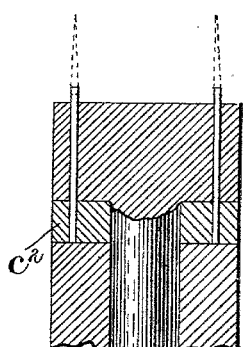

In the drawings, Figure 1 is a view principally in side elevation of the machine. Fig. 2 is a view in vertical section of the central and upper parts of the machine from side to side. Fig. 3 is a view in plan of the templet-side supporting table and of the bed carrying the heel-supports. Fig. 4 is a view showing the order of the compressor, awls, drivers, and ejector in relation to each other. Figs. 5, 6, and 7 are detail views. Fig. 8 is a detail view of the latching mechanism. Fig. 9 is a view in plan, inverted, of the pressure-head. Figs. 10, 11, and 12 represent a slight modification, to which reference is hereinafter made.

A is the base of the machine, and it has bearings for the crank-shaft $a$ and the pulley-shaft $a'$, the pulley-shaft being connected with the gears $a^2$ $a^3$ on the crank-shaft $a$ by the pinions $a^4$ $a^5$. (See Fig. 2.)

$a^6$ is the crank. The upper surface of the frame A forms a bed $a^7$ and supports the posts $a^8$, carrying the heel-formers $a^9$. From the base A there extends upwardly the column B, which is securely fastened to the base, and the outer surface of which forms a bearing for the heavy head C. This head C is reciprocated by means of the crank $a^6$ and the pitman $a^{10}$, the upper end of the pitman being connected with the head C by a cross-pin $a^{11}$. (See Fig. 2.) The head C carries a pressure-block $c$, a gang $c'$ of awls, a gang $c^2$ of drivers, and an ejector $c^3$, the pressure-block, awls, drivers, and ejector being detachably secured to the head. The head may have one group of these devices or it may have two. I have represented it as having two, arranged in two groups oppositely placed upon the head in relation to each other—that is, each pressure-block, gang of awls, drivers, and ejector being diametrically opposite the corresponding block, gang, and ejector of the other group.

D is a table supporting the pressure-blocks $d$, the templets $d'$, through which the awls are reciprocated, and the templets $d^2$, through which the drivers are reciprocated. It has the sleeve $d^3$, which bears upon the column B, and it is vertically movable upon said column, being attached to the head C by means of the connecting-straps $d^4$, the connecting-straps preferably having slots $d^5$ to permit the lost motion between the table and the head. The table is also connected with the head C by dowel-pins $d^6$, (see Fig. 2,) which prevent its turning and hold the various templets in register with the awls and drivers.

The templets are removable from their supporting-table.

Below the table D is another table E, which is fitted to the outer surface of the sleeve $d^3$ and is secured thereto by an annular plate $e$, bolted to the lower end of the sleeve $d^3$. (See Fig. 2.) This table E supports the dies $e'$. The dies are solid dies open at both ends. The table E, with the dies, rotates or turns upon the sleeve $d^3$, in order that the dies may be successively advanced from one operative device to the next one in order. To permit this table E to be easily rotated, it is desirable that each die have a slight vertical movement in the table E. This is provided by making the recesses or ways $e^2$ in the table which receive the extensions $e^3$ of the dies slightly wider from top to bottom than said extensions. I prefer also that the pressure plate or templet and driver-templet also have a slight vertical movement in their supporting-table independent of each other, and this is obtained in the same way. The templets and dies are represented as secured in place by screws which screw into the sides of the respective tables, so that their heads lap upon the outer edges of the templets and dies, respectively. (See Fig. 7.)

The heel-formers $a^9$ are made adjustable upon their posts or supports $a^8$ by means of removable spacing-blocks F, the said blocks being of any required thickness. The formers may also rest upon compressed-rubber cushions or other equivalent cushion adapted to yield to relieve the machine from a breaking strain.

The operation of the machine is as follows: Heel-blanks are placed in the die-cavities of the dies under the ejectors by an operator and an attendant. The die-table is then rotated, bringing the dies and heel-blanks under the pressure-blocks. The machine is then reciprocated and the two heels simultaneously molded or compressed. Heels are then placed in the next dies in order brought under the ejectors, the die-table and dies rotated, the compressed heel-blanks advanced to a position under the templets of the pricking devices and the uncompressed heels under the pressure-blocks. Another reciprocation of the machine is then made, two molded or compressed heel-blanks pricked, and two other heel-blanks molded or compressed. Heels are then introduced into the third set of dies under the ejectors, the die-table and dies turned as before, and a load of nails fed into each of the driving-templets. Another reciprocation of the machine is then made, two heel-blanks are then loaded, two pricked and two compressed. The fourth set of dies is then filled with heel-blanks and the table and dies again turned, the driving-templets loaded with nails, and the fourth reciprocation of the machine causes two heel-blanks to be compressed, two pricked, two loaded, and two to be ejected by the ejectors; and from this time each reciprocation of the machine will, of course, produce two loaded molded heel-blanks.

I prefer that the ejector be shaped substantially as represented in Fig. 4—that is, that it be made to fit quite closely the cavity of the die. The dies $e'$ must have a sufficient extent of movement in their supporting-table E to permit each one to fall sufficiently in relation to the various templets of the table D to clear the ends or heads of the nails—that is, the nails are not driven through the heel-blank, but are left projecting to be subsequently entirely driven into the same when the heel-blank is attached to the sole of a boot or shoe, and consequently the dies $e'$ must be movable vertically in relation to the table D to permit the ends or heads of the nails to clear the templets and tables as the dies are being turned from one templet to another.

In Fig. 10 I have represented the machine as organized to present the die-openings upwardly instead of downwardly by transposing the various operating devices—that is, the head C supports the formers, which then become vertically movable with it, while the pressure-block, awls, drivers, and ejector are carried upon the bed or are stationary. The table supporting the various templets is then undermost, the table supporting the dies being above it, and the dies of course being reversed, so that the openings into which the heel-blanks are placed are exposed or open at the top. This necessitates that the nails be fed into supplemental nail-holding blocks, as represented in Fig. 11.

Of course it is obvious that the organization herein described can be used for molding heel-blanks or for molding, pricking, and loading them; also, that the arrangement of the dies about a circular column locates them so that all are easily accessible; also, that by the arrangement of the dies, especially when in two groups for simultaneous operation upon two sets of heels, the machine is well balanced as to distribution of strain upon it.

In some instances the table D may not be provided with a pressure-block, the pressure-block instead being attached directly to the head C. It will be observed that the table D is cut away or open to expose the upper opening to the die beneath the ejector, so that the ejector may operate directly upon the exposed heel-blank or upon the ends of the nails which project from it.

The die-carrying table is represented as having a number of registering holes $h$, with which a spring-pin $h'$, carried by the table D, is adapted to successively register.

Having thus fully described my invention, I claim and desire to secure by Letters Patent of the United States—

1. In a heel-molding machine, the combination of a pressure-head, a laterally-movable die open at both ends, a vertically-movable block independent of the pressure-block and of the die, arranged between the die and the pressure-head, and a heel-former, the pressure-head and movable block having a fixed relation to each other, while the die has a separable relation to the pressure-block, substantially as described.

2. The combination in a heel-molding machine of a reciprocating head, a pressure-block, and a gang of awls carried by said head, a table and a templet and pressure-block carried thereby side by side, the dies $e'$ laterally movable in relation to said pressure-block and templet and the heel-formers $a^9$, substantially as described.

3. The combination of the head, a compressor-block, gang of awls, and gang of drivers supported thereby, a table D vertically movable but non-rotating, an awl-templet and a driver-templet carried thereby, a rotating table E, the open dies $e'$ carried thereby, and the heel-formers $a^9$, substantially as described.

4. The combination of the head, a compressor-block, gang of awls, gang of drivers, and ejector supported thereby, a table D vertically movable but non-rotating, an awl-templet and a driver-templet carried thereby, a rotating table E, the open dies $e'$ carried thereby, and the heel-formers $a^9$, substantially as described.

5. The combination of the head C having the compressing-block, the gang of awls, gang of drivers, and ejector, the table D, the templets $d'$, $d^2$, the said templets, the registering pin $d^6$, the straps $d^3$, the rotary carriage or table E, the dies $e'$ open at both ends and movable in relation to the table E, substantially as described.

6. The combination of the gang or group of drivers, the table D, the templet carried thereby, having a slight vertical movement in the table, the laterally-movable table E, the dies $e'$ carried thereby, and having a vertical movement in relation to the table D, and the heel-former $a^9$, substantially as described.

FREEBORN F. RAYMOND, 2D.

Witnesses:
J. M. DOLAN,
A. B. MERRILL,